US006445400B1

(12) United States Patent
Maddalozzo, Jr. et al.

(10) Patent No.: US 6,445,400 B1
(45) Date of Patent: Sep. 3, 2002

(54) COMPUTER CONTROLLED USER INTERACTIVE DISPLAY SYSTEM WITH EACH OF A PLURALITY OF WINDOWS HAVING A BORDER OF A COLOR VARIED TO REFLECT A VARIABLE PARAMETER BEING TRACKED FOR THE WINDOW

(75) Inventors: John Maddalozzo, Jr.; Gerald Francis McBrearty, both of Austin; Hypatia Rojas, Round Rock; Johnny Meng-Han Shieh, Austin, all of TX (US)

(73) Assignee: International Business Machines Corporation, Armonk, CA (US)

( * ) Notice: Subject to any disclaimer, the term of this patent is extended or adjusted under 35 U.S.C. 154(b) by 0 days.

(21) Appl. No.: 09/404,279

(22) Filed: Sep. 23, 1999

(51) Int. Cl.[7] .................................................. G06F 3/00

(52) U.S. Cl. ....................... 345/803; 345/781; 345/790; 345/797; 345/802

(58) Field of Search ................................ 345/781, 790, 345/794, 796, 797, 789, 803, 802, 765, 866, 589, 593, 595

(56) References Cited

U.S. PATENT DOCUMENTS

| 5,231,676 | A | * | 7/1993 | Mahoney | 382/22 |
|---|---|---|---|---|---|
| 5,390,295 | A | * | 2/1995 | Bates et al. | 345/157 |
| 5,412,776 | A | * | 5/1995 | Bloomfield et al. | 345/160 |
| 5,487,143 | A | * | 1/1996 | Southgate | 345/157 |
| 5,548,304 | A | * | 8/1996 | Yoshino et al. | 345/145 |
| 5,548,704 | A | * | 8/1996 | Steiner et al. | 345/158 |
| 5,767,835 | A | * | 6/1998 | Obbink et al. | 345/146 |
| 5,796,402 | A | * | 8/1998 | Ellison-Taylor | 345/788 |
| 6,332,163 | B1 | * | 12/2001 | Bowma-Amuah | 709/231 |

* cited by examiner

Primary Examiner—Raymond J. Bayerl
Assistant Examiner—Cuong T. Thai
(74) Attorney, Agent, or Firm—J. B. Kroft; Volel Emile

(57) ABSTRACT

There is provided a computer controlled display interface permitting simplified tracking of access time periods to secured data in a user interactive display system with a multitude of displayed windows comprising secured data. A process is provided for tracking for each of said plurality of windows a variable parameter relative to the window, in combination with a process for displaying along at least a portion of the borders of each of said windows a color varying with said variable parameter being tracked for said window. In secured access systems, the parameter being tracked is the period of access time.

21 Claims, 7 Drawing Sheets

COMPUTER CONTROLLED USER INTERACTIVE DISPLAY SYSTEM WITH EACH OF A PLURALITY OF WINDOWS HAVING A BORDER OF A COLOR VARIED TO REFLECT A VARIABLE PARAMETER BEING TRACKED FOR THE WINDOW

TECHNICAL FIELD

The present invention relates to user interactive computer supported display technology and particularly to such user interactive systems and methods which are user friendly and provide interactive users with a window interface environment which is easy to use and readily adaptable to systems requiring data security.

BACKGROUND OF RELATED ART

The 1990's decade has been marked by a technological revolution driven by the convergence of the data processing industry with consumer electronics industries. This advance has been even further accelerated by the extensive consumer and business involvement in the Internet over the past few years. As a result of these changes, it seems as if virtually all aspects of human endeavor in the industrialized world requires human-computer interfaces. There is a need to make computer directed activities accessible to many people who were until recently computer indifferent. In order for the vast computer supported market places to continue and be commercially productive, it will be necessary for a large segment of computer indifferent people to become involved with computer interfaces.

One continuous impediment toward making user interactive computer display interfaces friendlier and more accessible to users is data security. With the accelerated use of the Internet for business functions, including electronic commerce, the possibility for data loss and theft has also greatly increased. The user involved with secured systems may be burdened with dozens of access passwords and different access protocols to various databases. To make security matters even more cumbersome and complex, even when the user provides the protocols and passwords to access secure data, he does not get access for an indefinite time period. Usually access time periods are limited to hours. The user is required to renew his access before the expiration of the time period. In most security access protocols, renewal before expiration is not as cumbersome as an original secure system access. If the time period is allowed to run out, then the user must startup his access from the beginning or, worse yet, he could lose track of his data completely.

In a great many business and technical operations, it is not unusual for the interactive user to be dealing with several secure data sessions in several windows at the same time on his display. Since such sessions likely have commenced at different times and deal with data bases permitting access for differing time periods, it may readily be seen that keeping track of the expiration of time periods for access for the various windows can be quite stressful and frustrating to the interactive user.

SUMMARY OF THE PRESENT INVENTION

The present invention simplifies the tracking of access time periods to secured data in a computer controlled user interactive display system with means for storing a plurality of displayed windows comprising secured data. Means are provided for tracking for each of said plurality of windows a variable parameter relative to the window, in combination with means for displaying along at least a portion of the borders of each of the windows a color varying with said variable parameter being tracked for said window. In secured access systems, the parameter being tracked is the period of access time.

The advantages of having the window borders change color as an indication of progress toward the expiration of the access time period for each window are clear over other possibilities. If a sound indicator were used, with multiple windows, it would be difficult to determine to which window the sound applied. Similarly, any kind of visual indicator within the window would be subject to the probability of being covered over by another window in any desktop window environment where windows are continually being brought up and moved around. In the case of the present invention, even when the window is overlapped by another window, it is likely that some portion of its border would still be visible to inform the user of the timeout based upon the color change in the border.

In accordance with a variation of the invention in the case where the portion of the window border displaying a color varying with said time period in an overlapped window is completely overlapped, there may be provided means responsive to the near expiration of said time period for raising the overlapped window above its overlapping windows so that the border will be visible.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
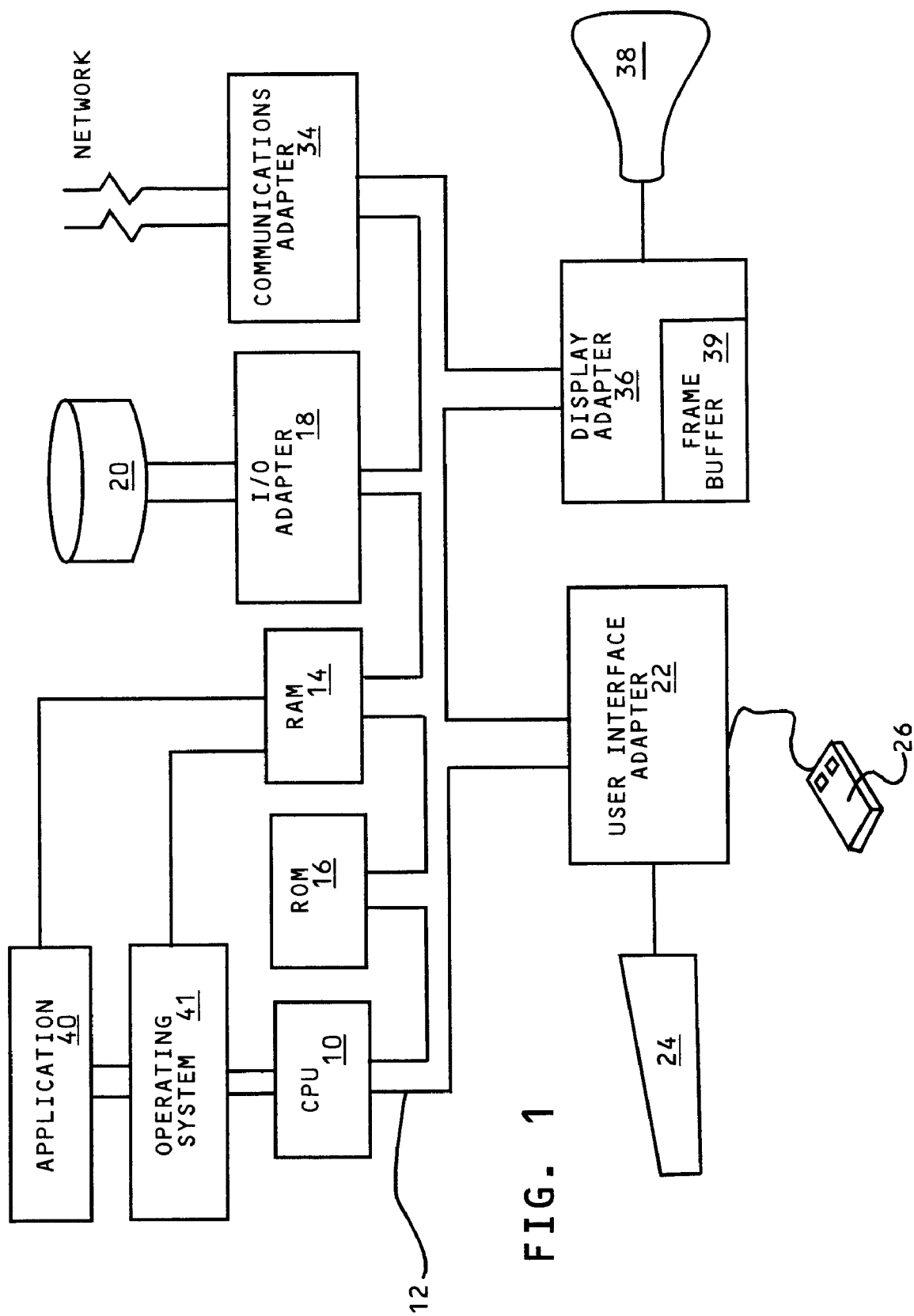
FIG. 1 is a block diagram of an interactive data processor controlled display system including a central processing unit which is capable of implementing the present invention of tracking a parameter for a plurality of windows, and displaying variations in such parameter by varying the color of a window border.

Referring to FIG. 1, a typical data processing system is shown which may function as the computer controlled display terminal used in controlling the window stack hierarchies processed in accordance with the present invention and for providing the apparatus for tracking variable parameters relative to the windows, such as time, and for varying the color of window frames responsive to the variation of the parameter. A central processing unit (CPU) 10, such as one of the PC microprocessors, distributed by International Business Machines Corporation (IBM), or workstations, e.g. RISC System/6000$^{(TM)}$ (RS/6000) (RISC System/6000 is a trademark of IBM) series available from IBM is provided and interconnected to various other components by system bus 12. An operating system 41 runs on CPU 10, provides control and is used to coordinate the function of the various components of FIG. 1. Operating system 41 may be one of the commercially available windows type of operating systems such as the AIX 6000$^{(TM)}$ operating system; Microsoft's Windows 98$^{(TM)}$ or Windows NT$^{(TM)}$, as well as UNIX and AIX operating systems. Application programs 40, controlled by the system, are moved into and out of the main memory, Random Access Memory (RAM), 14. These programs include the program of the present invention, to be subsequently described, in providing changing color window frames which change while tracking a parameter such as timeout of password access. A read only memory (ROM) 16 is connected to CPU 10 via bus 12 and includes the basic input/output system (BIOS) that controls the basic computer functions. RAM 14, I/O adapter 18 and communications adapter 34 are also interconnected to system bus 12. It should be noted that software components, including the operating system 41 and the application 40, are loaded into RAM 14, which is the computer system's main memory. I/O adapter 18 may be a small computer system adapter that communicates with the disk storage device 20, i.e. a hard drive. Communications adapter 34 interconnects bus 12 with an outside network, such as the Internet, enabling the data processing system to communicate with other such systems. In present day systems, windowed data may be transmitted from other computer stations in a network, such as the Internet.

I/O devices are also connected to system bus 12 via user interface adapter 22 and display adapter 36. Keyboard 24 and mouse 26 are interconnected to bus 12 through user interface adapter 22. It is through such input devices that the user interactive functions involved in the displays of the present invention may be implemented. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like. As previously mentioned, in order to accommodate the hierarchies of overlapping and hidden windows, the frame buffer 39 should be a depth buffer; for example, the depth buffer of U.S. Pat. No. 5,241,565. By using the aforementioned I/O devices, a user is capable of inputting information to the system through the keyboard 24, trackball 32 or mouse 26 and receiving output information from the system via display 38.

Figure 2:
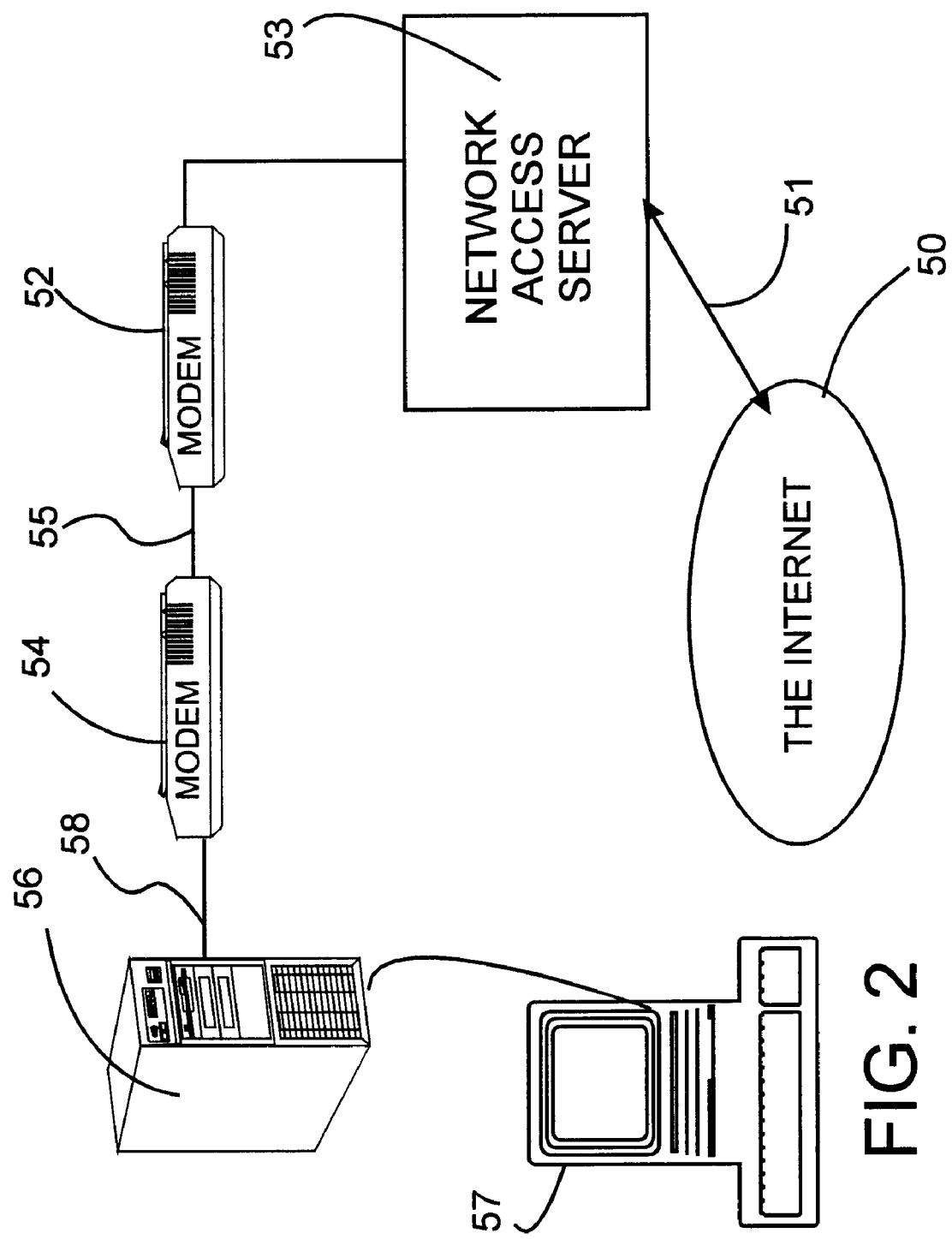
FIG. 2 is a generalized diagrammatic view of an Internet or World Wide Web portion through which secured a database involved in the present invention may be accessed.

As has been set forth hereinabove, the present invention is particularly effective in keeping track of timeouts of accesses to secured databases on the Internet. A generalized diagram of a portion of the Internet or World Wide Web (Web), which the computer 56 controlled display terminal 57 may use for Web page or document or linked Web page or document access and display according to the present invention, is connected as shown in FIG. 2. Computer 56 and display terminal 57 are the computer system shown in FIG. 1 and connection 58 (FIG. 2) is the network connection shown in FIG. 1. Reference may be made to *Mastering the Internet*, G. H. Cady et al., published by Sybex Inc., Alameda, Calif., 1996, at pp. 136–147, for typical connections between local display workstations to the Internet via network servers, any of which may be used to implement the system on which this invention is used. The system embodiment of FIG. 2 is one of these known as a "host-dial connection". Such host-dial connections have been in use for over 30 years through network access servers 53 which are linked 51 to the Internet 50. The servers 53 are maintained by a service provider to the client's display terminal 57. The host's server 53 is accessed by the client terminal 57 through a normal dial-up telephone linkage 58 via modem 54, telephone line 55 and modem 52. The accessed secured data files are downloaded to display terminal 57 through controlling server 53 and computer 56 via the telephone line linkages from server 53, which may have accessed them from the Internet 50 via linkage 51. Depending on the databases accessed, the secured data files will each require accessing protocols and passwords. Almost all of such secured databases grant access for limited time periods; before the expiration of which, the user's access must be renewed or the accessed data will be eliminated.

Figure 3:
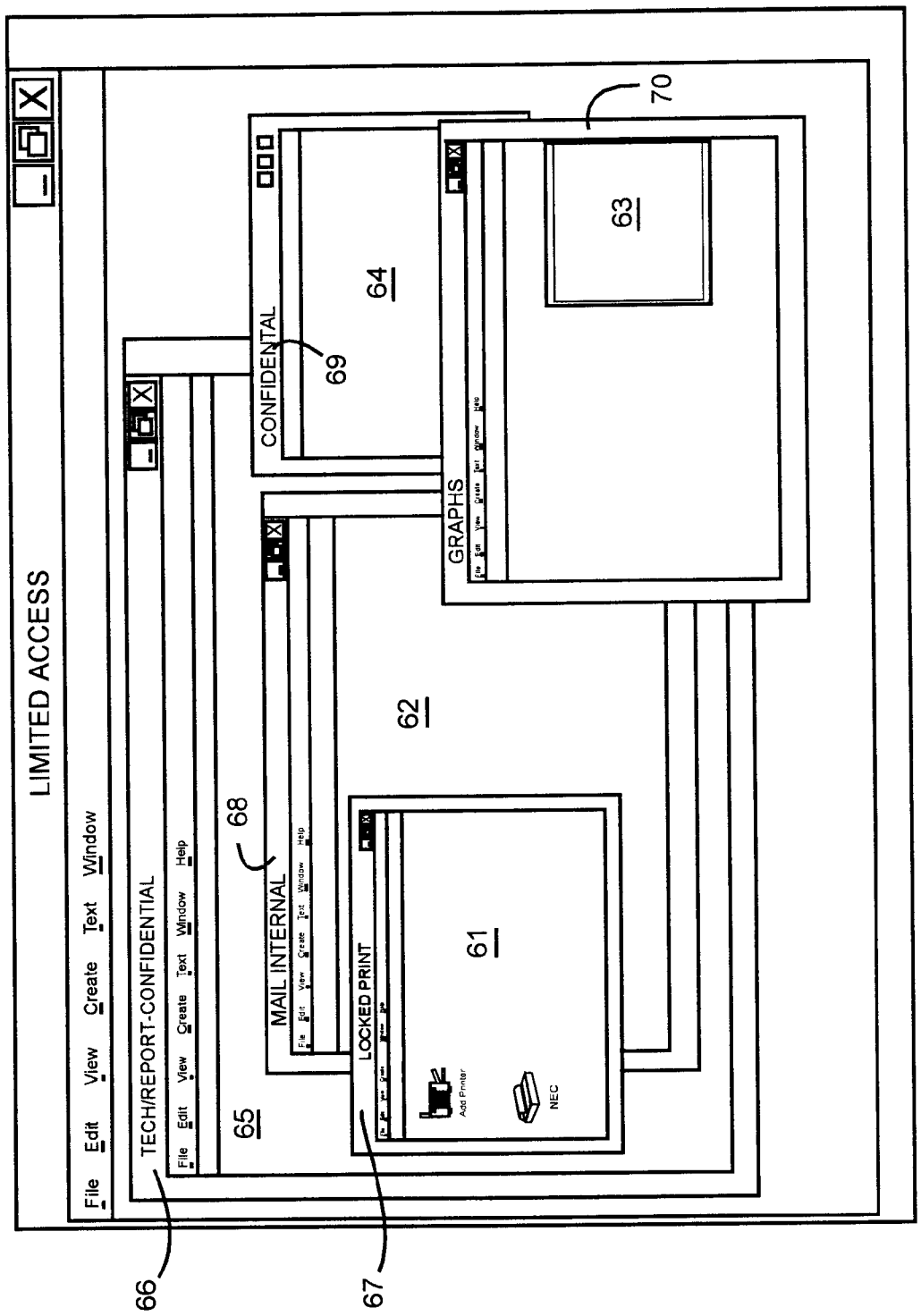
FIG. 3 is a diagrammatic staring view of a display screen with a hierarchy of windows which will be used to illustrate the present invention involving the tracking of the decay of timed access to secure databases through the change in color of the window frames or borders.

There will now be described with respect to FIGS. 3 through 5, how the present invention helps the user track the decay or timing out of access time to secured system data in said windows. As set forth above, the problems of tracking time decay or timeouts of secured access to databases is most prevalent with publicly accessible networks and, particularly, the Internet or Web (the terms may be used interchangeably). There are many available security systems to protect such data. They all involve following a set of system protocols dependent on entering a password and then being granted access to data for a definite time period, usually up to 24 hours. In the desktop environment of today, the user who has accessed such secured data from many databases has the data available on his display in a set of respective windows, often fairly extensive in number.

A secured data system widely used in connection with data accessed over the Internet is the *Kerberos: NetWork Authentication Protocol*, developed by and available from the Massachusetts Institute of Technology (MIT) (Latest version is Kerberos V5, Release 1.0.6 and is available from MIT over the Internet at http://web.mit.edu/kerberos/www/). In any event, data accessed through Kerberos has a time decay or timeout of several hours before the expiration of which the user must renew or refresh the password; otherwise the data is removed. FIGS. 3 through 5 show how the present invention directs the user's attention to the tracking of this time period decay. In FIG. 3, a display with secured data from differing sources is shown in each of windows 61, 62, 63, 64 and 65. It may be assumed that the desktop environment of the display may have many more windows, some with and some without secured data. However, in order to simplify this illustration, only five windows are shown, all having secured data. Although in this simplified illustration all of the windows are shown at an initial stage where no time decay has yet occurred, it will be understood that each of the windows may have data accessed at different times and from databases and access protocols having different time decay periods. The key to the present invention is that the frames or borders 66 through 70 of the respective windows, 61 through 65, will change in color with their respective data access time decay. At this initial stage, the borders 66 through 70 of each of these windows is shown as white or blank in color to indicate that at this initial stage, much time still remains of the time period.

Figure 4:
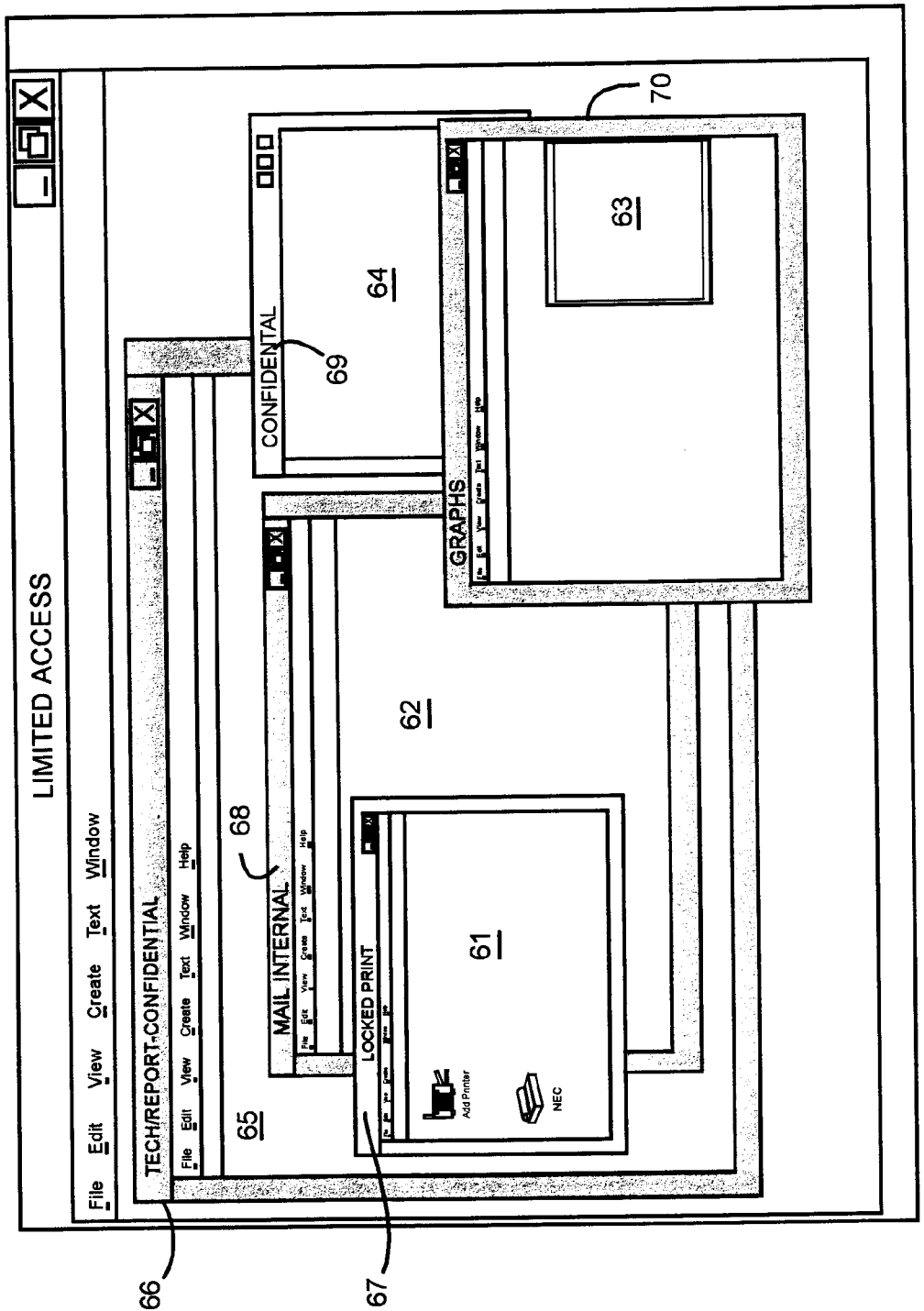
FIG. 4 is the same diagrammatic view of the display screen of FIG. 3 at a later point in the tracking of the decay of access time periods in several of the windows.
Figure 5:
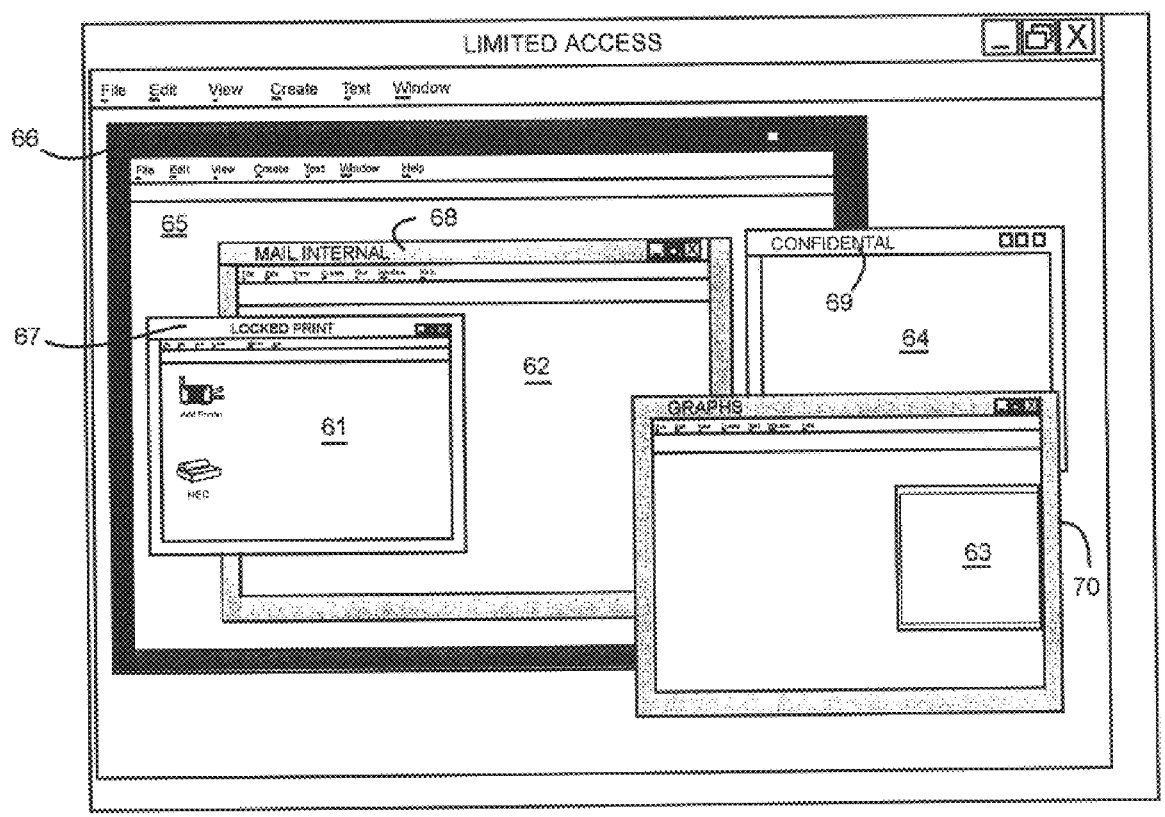
FIG. 5 is the same diagrammatic view of the display screen of FIG. 4 at a still later point in the tracking of the decay of access time periods in several of the windows.

Then, in FIG. 4, some time has passed, and frames 66, 68 and 70, respectively, of three windows 65, 62 and 63 have changed in color as indicated by the gray-tones in the border to show that a significant portion of their time period has been used up while frames 67 and 69 of windows 61 and 64 remain blank to indicate that they, as yet, have no time decay considerations. It should be noted that for illustration purposes a darkening of color, i.e. a densification of the gray-tones in the frames is used to indicate the approach of an expiration of the time period of access to the data in the window. Finally, in FIG. 5, at a later time stage, while the other window borders have not changed significantly, the great change in border 66 of window 65 would indicate to the user that the expiration of his time period of access to the secured data in the window is approaching fast and that he should take renewal action if he wishes to continue to use the data in the window.

In the cluttered desktop environment, it is likely that some portion of a window frame will be visible even in a setup with many overlapping windows and that this should be enough to get the user's attention to the impending timeout. In the event that a given window may be completely overlapped so that its entire frame will be covered as the expiration approaches, a routine may be provided for bringing a covered window to the top of the stack of overlapping windows just before expiration so the user may note the change in frame color and take appropriate refresh action. U.S. Pat. No. 5,046,001, Barker et al., provides a process for bringing a covered window to the top of the stack in a desktop environment. Its principles have been implemented in many existing windows systems. The process could be initiated at a suitable time period shortly before timeout in the present process.

Figure 6:
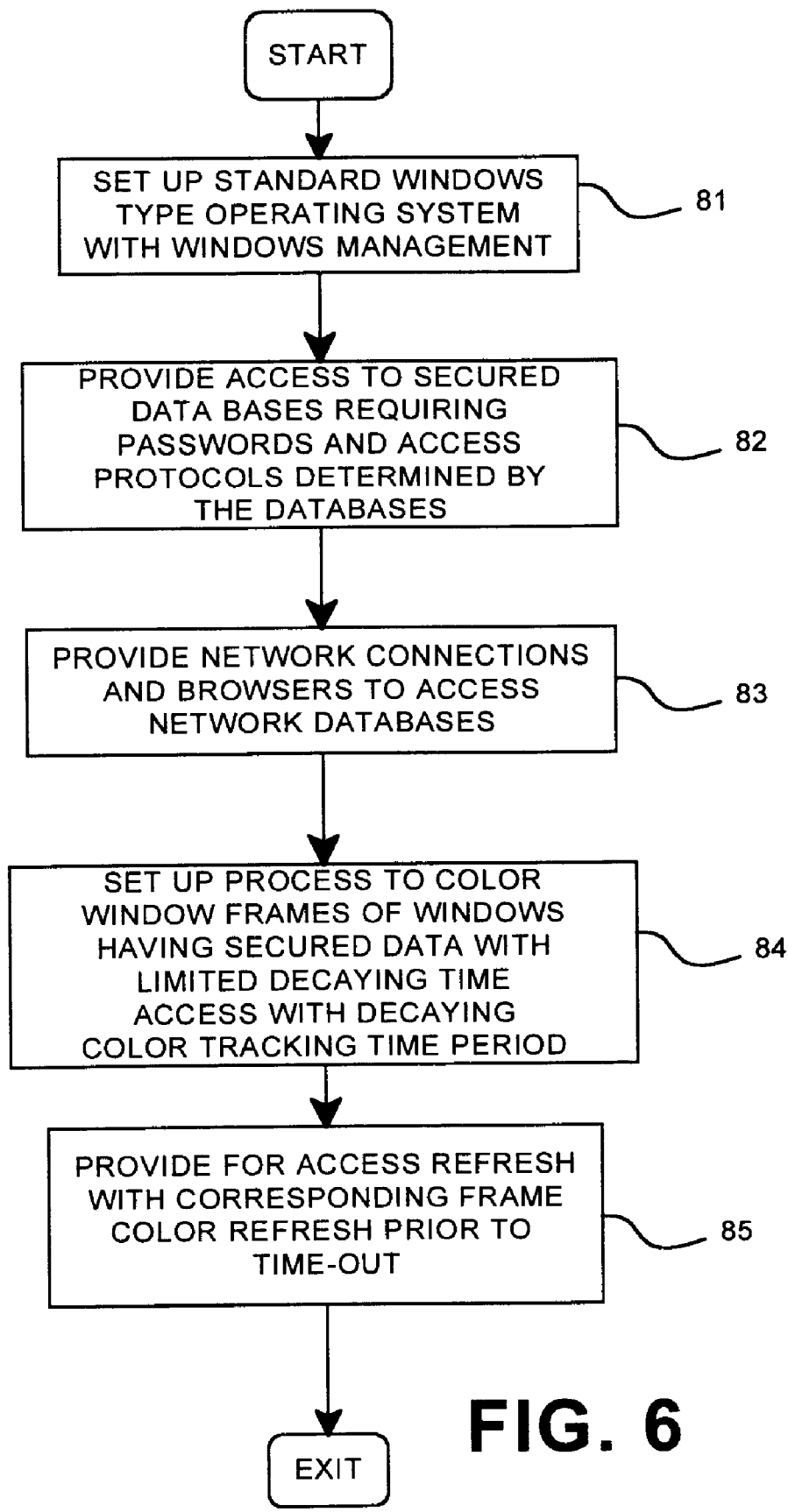
FIG. 6 is a general flowchart of a program set up to implement the present invention for tracking for a plurality of windows, a security access timeout and displaying variations in the timeout by varying the color of window borders.

While this invention is very significant for directing a user's attention to decaying time periods for access to secure data accessed through the Internet, it should be understood that it has further value in any desktop environment crowded with overlapping windows where it is necessary to focus the user's attention on other variable parameters related to the data in the windows, e.g. pressure, temperature or concentration if the data in the windows involves chemical or physical parameters. The variable parameters may also be business parameters such as costs or production numbers. Now, with reference to FIG. 6, we will describe a process implemented by a program according to the present invention for alerting the users of secured accessed data in a multi-windowed desktop environment to the expiration of the time period of access. The program routines, which are created by the process of FIG. 6, implement the operations described with respect to FIGS. 3 through 5. In the flowchart of FIG. 6, a basic type of operating system is set up, step 81, using any operating system for managing a hierarchy of windows, e.g. Windows95(™) or Motif for Unix or AIX. Next, step 82, secured access is provided to a variety of secured databases reached through the Internet, e.g. the above-described Kerberos protocols from MIT. Next, appropriate network access connections are provided through browser programs, step 83, using conventional hardware as described in FIG. 2. Then, step 84, a routine is set up for each window having secured data to set the appropriate time decay period, monitor the time passage for the window, to start with an initial color for the window frame and to change the color with time as the time period for each window expires. Finally, step 85, means must be provided for permitting the user to reaccess or refresh access to any secured database prior to the expiration of the time period. This, for example, is provided by the Kerberos protocols described above.

Figure 7:
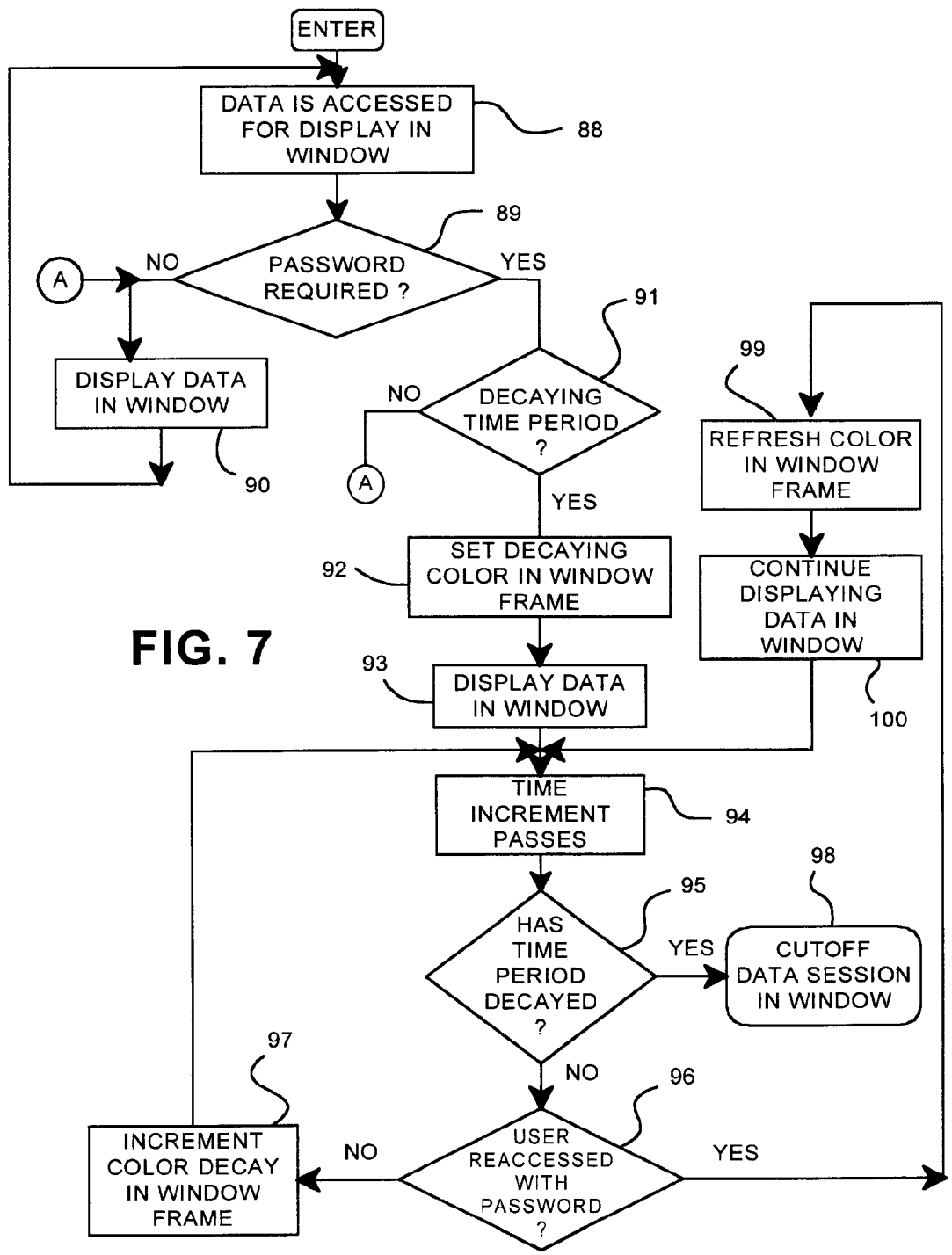
FIG. 7 is a flowchart of an illustrative run of a program set up in accordance with the flowchart of FIG. 6.

Now that the basic program has been described and illustrated, there will be described with respect to FIG. 7 a flow of a simple operation showing how the program could be run to track time period decay for secured data in windows. Data is accessed through the Internet for display in a particular window, step 88. A determination is made as to whether the data is secured and requires password protocols. If No, then step 90, the data is conventionally displayed in a window and the process is returned to step 88 so that other data files may be received. If the decision from step 90 is Yes, the data is secured and password protocols are required, then after the password is confirmed, there is an additional step of determining whether there is any decay time period, i.e. a limited time period during which the data will be accessible to the user. Even now there are secured databases with no time limitations. If No there are no time period limitations, then the process goes to step 90 via branch "A", and the data is conventionally displayed in an appropriate window. If the decision from step 91 is Yes, there is a decaying time period during which the data will be accessible, then the decaying color routine for tracking the time period with the decaying color is set up for the frame of the window containing the accessed secured data, step 92, and the data is displayed in a window with a colored frame, step 93. Now let us consider how the secured data window with the colored frame tracks the timeout or decay of access time. After a time increment passes, step 94, a determination is made, step 95, as to whether the time period for the window has completely decayed, i.e. expired. If Yes, then step 98, the data session in the window may be cutoff and the data no longer available to the user. If No, then decision step 96, a determination is made as to whether the user has reaccessed or refreshed his password. If No, the user has not as yet refreshed, then the color change increment in each of the timed access window frames is made to correspond with the actual time increment decay, step 97, and the process is returned to step 94 where the next time increment is passed while the process is continued as previously described. However, if the decision from step 96 is Yes, the user has reaccessed with his password, the process goes to step 99 where the color in the reaccessed window frame is also refreshed to its initial color to reflect this reaccess, the display of the window continued, step 100, and the process is returned to step 94 where the next time increment is passed and the above-described process continued.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a local area network (LAN) or a wide area network (WAN), such as the Internet, when required by the user of the present invention.

One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. A computer controlled user interactive display system comprising:
   means for storing a plurality of displayed overlapping windows comprising data,
   means for tracking for each of said plurality of overlapping windows a limited time period for user access to the window, and
   means for displaying along at least a portion of the borders of each of said windows a color varying with said time period being tracked for said window.

2. The display system of claim 1 further including means for limiting access for a limited time period to each of said plurality of windows to users inputting a password wherein said limited time period is tracked.

3. The display system of claim 2 wherein at least one of said windows is overlapped by another window.

4. The display system of claim 3 wherein:
   said portion of said border displaying a color varying with said time period in said overlapped window is completely overlapped, and
   further including means responsive to the near expiration of said time period for raising the overlapped window above its overlapping window.

5. The display system of claim 2 wherein said data in said windows is obtained from databases through a computer network.

6. In a computer controlled interactive display system, a method for alerting interactive users to variable parameters relative to the display comprising:
   storing a plurality or displayed overlapping windows comprising data,
   tracking for each of said plurality of windows a variable a limited time period for user access to the window, and
   displaying along at least a portion of the borders of each of said windows a color varying with said time period being tracked for said window.

7. The method of claim 6 further including the step of limiting access for a limited time period to each of said plurality of windows to users inputting a password wherein said limited time period is tracked.

8. The method of claim 7 wherein at least one of said windows is overlapped by another window.

9. The method of claim 8 wherein:
   said portion of said border displaying a color varying with said time period in said overlapped window is completely overlapped, and
   further including the step, responsive to the near expiration of said time period, of raising the overlapped window above its overlapping window.

10. The method of claim 7 wherein said data in said windows is obtained from databases through a computer network.

11. A computer program having program code included on a computer readable medium for the interactive control of a display system comprising:
    means for storing a plurality of displayed overlapping windows comprising data,
    means for tracking for each of said plurality of windows a limited time period for user access to the window, and
    means for displaying along at least a portion of the borders of each of said windows a color varying with said time period being tracked for said window.

12. The computer program of claim 11 further including means for limiting access for a limited time period to each of said plurality of windows to users inputting a password wherein said limited time period is tracked.

13. The computer program of claim 12 wherein at least one of said windows is overlapped by another window.

14. The computer program of claim 13 wherein:
    said portion of said border displaying a color varying with said time period in said overlapped window is completely overlapped, and
    further including means responsive to the near expiration of said time period for raising the overlapped window above its overlapping window.

15. The computer program of claim 12 wherein said data in said windows is obtained from databases through a computer network.

16. A computer controlled user interactive display system comprising:
    means for setting a time period during which data may be accessed,
    means for tracking said time period, and
    means for displaying a color continuously varying with the passage of the tracked time in said period.

17. In a computer controlled user interactive display system, a data security system comprising:
    means for identifying a user permitted access to secured data,
    means for setting a time period during which said data may be accessed by said user,
    means for tracking said time period, and
    means for displaying a color continuously varying with the passage of the tracked time in said period.

18. In a computer controlled user interactive display system, a method of alerting a user to the passage of a time period comprising:
    setting a time period during which data may be accessed,
    tracking said time period, and
    displaying a color continuously varying with the passage of the tracked time in said period.

19. In a computer controlled user interactive display system, a method of time related data security comprising:
    identifying a user permitted access to secured data,
    setting a time period during which said data may be accessed by said user,
    tracking said time period, and
    displaying a color continuously varying with the passage of the tracked time in said period.

20. A computer program having program code included on a computer readable medium for alerting a user of a computer controlled display system to the passage of a time period comprising:
    means for setting a time period during which data may be accessed,
    means for tracking said time period, and
    means for displaying a color continuously varying with the passage of the tracked time in said period.

21. A computer program having program code included on a computer readable medium for controlling time related data security in a computer controlled display system comprising:
    means for identifying a user permitted access to secured data,
    means for setting a time period during which said data may be accessed by said user,
    means for tracking said time period, and
    means for displaying a color continuously varying with the passage of the tracked time in said period.

* * * * *